(12) United States Patent
Sumiya

(10) Patent No.: US 11,521,652 B2
(45) Date of Patent: Dec. 6, 2022

(54) RECORDING TAPE CARTRIDGE

(71) Applicant: FUJIFILM CORPORATION, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 36 days.

(21) Appl. No.: 17/198,254

(22) Filed: Mar. 11, 2021

(65) Prior Publication Data
US 2021/0304795 A1 Sep. 30, 2021

(30) Foreign Application Priority Data

Mar. 25, 2020 (JP) .............................. JP2020-055022

(51) Int. Cl.
*G11B 23/04* (2006.01)
*G11B 23/107* (2006.01)

(52) U.S. Cl.
CPC .......... *G11B 23/044* (2013.01); *G11B 23/043* (2013.01); *G11B 23/107* (2013.01)

(58) Field of Classification Search
None
See application file for complete search history.

(56) References Cited

U.S. PATENT DOCUMENTS

| | | | |
|---|---|---|---|
| 6,958,887 B2* | 10/2005 | Hiraguchi | G11B 15/07 |
| 6,967,630 B2* | 11/2005 | Tada | H01Q 1/22 |
| | | | 343/742 |
| 7,227,721 B1* | 6/2007 | Kientz | G11B 23/042 |
| 7,240,825 B2* | 7/2007 | Tada | G11B 23/037 |
| | | | 235/375 |
| 7,516,913 B2* | 4/2009 | Ashikawa | G11B 23/042 |
| | | | 242/348 |
| 7,770,835 B2* | 8/2010 | Sumiya | G11B 23/08714 |
| | | | 242/348 |
| 2003/0089809 A1* | 5/2003 | Maekawa | G11B 23/107 |
| 2003/0183715 A1* | 10/2003 | Hiraguchi | G11B 23/107 |
| | | | 242/348 |
| 2004/0042122 A1* | 3/2004 | Honda | G11B 23/042 |
| 2005/0040272 A1* | 2/2005 | Argumedo | G11B 23/107 |
| | | | 235/487 |

(Continued)

FOREIGN PATENT DOCUMENTS

JP 2000-036178 A 2/2000

*Primary Examiner* — William A. Rivera
(74) *Attorney, Agent, or Firm* — Solaris Intellectual Property Group, PLLC

(57) ABSTRACT

Provided is a recording tape cartridge including: a case that accommodates a reel on which a recording tape is wound and includes a reference surface that serves as a reference in an axial direction of the reel in a case where the case is loaded into a drive device; noncontact communication mediums on which individual information is recorded, the noncontact communication mediums being accommodated in the case in a state where at least two noncontact communication mediums overlap each other and having a plate shape; and a supporting portion that is formed in the case and supports the noncontact communication mediums such that the noncontact communication mediums are disposed while being inclined with respect to the reference surface at an angle of approximately 45 degrees.

5 Claims, 6 Drawing Sheets

(56) References Cited

U.S. PATENT DOCUMENTS

| | | | |
|---|---|---|---|
| 2006/0026623 A1* | 2/2006 | Asano | G11B 23/107 |
| | | | 720/729 |
| 2008/0218901 A1* | 9/2008 | Haustein | G11B 23/107 |
| | | | 360/90 |
| 2009/0225472 A1* | 9/2009 | Sumiya | G11B 23/107 |
| | | | 360/134 |
| 2009/0242682 A1* | 10/2009 | Takenoshita | G11B 23/107 |
| | | | 242/348 |

* cited by examiner

RECORDING TAPE CARTRIDGE

CROSS-REFERENCE TO RELATED APPLICATIONS

This application claims priority under 35 USC 119 from Japanese Patent Application No. 2020-055022 filed Mar. 25, 2020, the disclosure of which is incorporated by reference herein.

BACKGROUND

1. Technical Field

The present disclosure relates to a recording tape cartridge.

2. Related Art

A recording tape cartridge into which a noncontact communication medium capable of noncontact communication is built for each of two corner portions is known in the related art (for example, refer to JP2000-036178A). In the noncontact communication medium, individual information such as a unique ID, product type identification, use history, production history, and an index of data recorded on a recording tape of the recording tape cartridge are recorded.

SUMMARY

Meanwhile, in a case where the capacity of the recording tape cartridge is made high, the capacity of the noncontact communication medium also needs to be made high. As a method of increasing the capacity of the noncontact communication medium, it is conceivable to provide one noncontact communication medium for each of two corner portions as described above. However, in the case of such a configuration, a drive device needs to include two noncontact reading and writing devices corresponding to the noncontact communication mediums and thus there is a problem that there is an increase in manufacturing cost of the drive device.

In addition, as a method of increasing the capacity of the noncontact communication medium, it is also conceivable to increase the capacity of an IC chip provided on the noncontact communication medium (to 32 KB, for example). However, increasing the capacity of the IC chip requires a period and cost for development of the IC chip and there is also a problem that the capital investment and the running cost become expensive.

Therefore, an object of the present disclosure is to obtain a recording tape cartridge with which it is possible to increase the capacity of a noncontact communication medium at low cost.

In order to achieve the object as described above, a recording tape cartridge according to an aspect of the present disclosure comprises: a case that accommodates a reel on which a recording tape is wound and includes a reference surface that serves as a reference in an axial direction of the reel in a case where the case is loaded into a drive device; noncontact communication mediums on which individual information is recorded, the noncontact communication mediums being accommodated in the case in a state where at least two noncontact communication mediums overlap each other and having a plate shape; and a supporting portion that is formed in the case and supports the noncontact communication mediums such that the noncontact communication mediums are disposed while being inclined with respect to the reference surface at an angle of approximately 45 degrees.

According to the present disclosure, it is possible to increase the capacity of a noncontact communication medium at low cost.

BRIEF DESCRIPTION OF THE DRAWINGS

Exemplary embodiments of the present invention will be described in detail based on the following figures, wherein.

DETAILED DESCRIPTION

Hereinafter, an embodiment according to the present disclosure will be described in detail based on the drawings. For the sake of convenience of description, in FIG. 1, a direction in which a recording tape cartridge 10 is loaded into a drive device is represented by an arrow A and corresponds to a frontward direction (front side) of the recording tape cartridge 10. In addition, a direction along an arrow B orthogonal to the arrow A corresponds to a rightward direction (right side). In addition, a direction orthogonal to the direction along the arrow A and the direction along the arrow B is represented by an arrow C and corresponds to an upward direction (upper side) of the recording tape cartridge 10.

Figure 1:
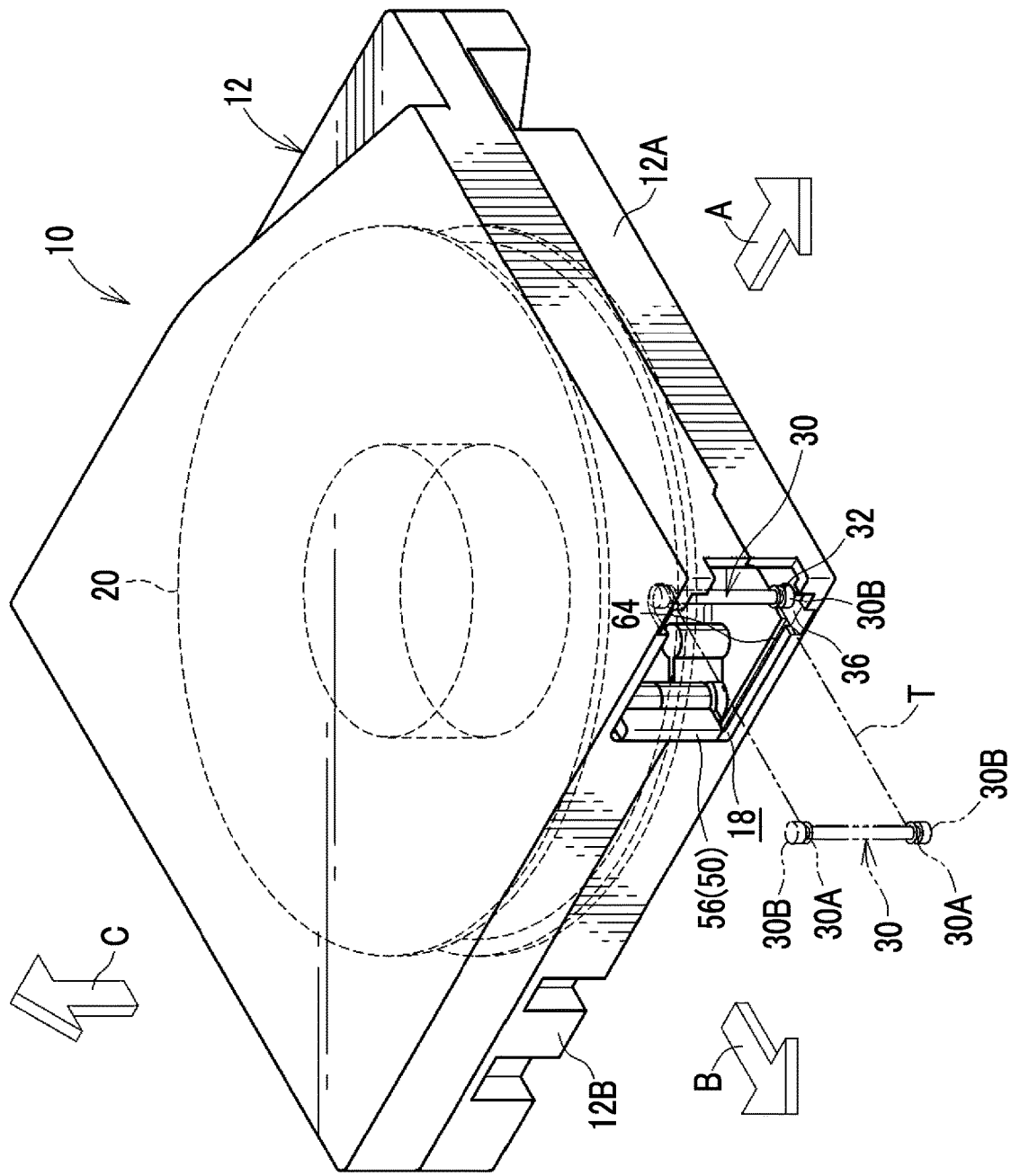
FIG. 1 is a perspective view of a recording tape cartridge according to a present embodiment.
Figure 2:
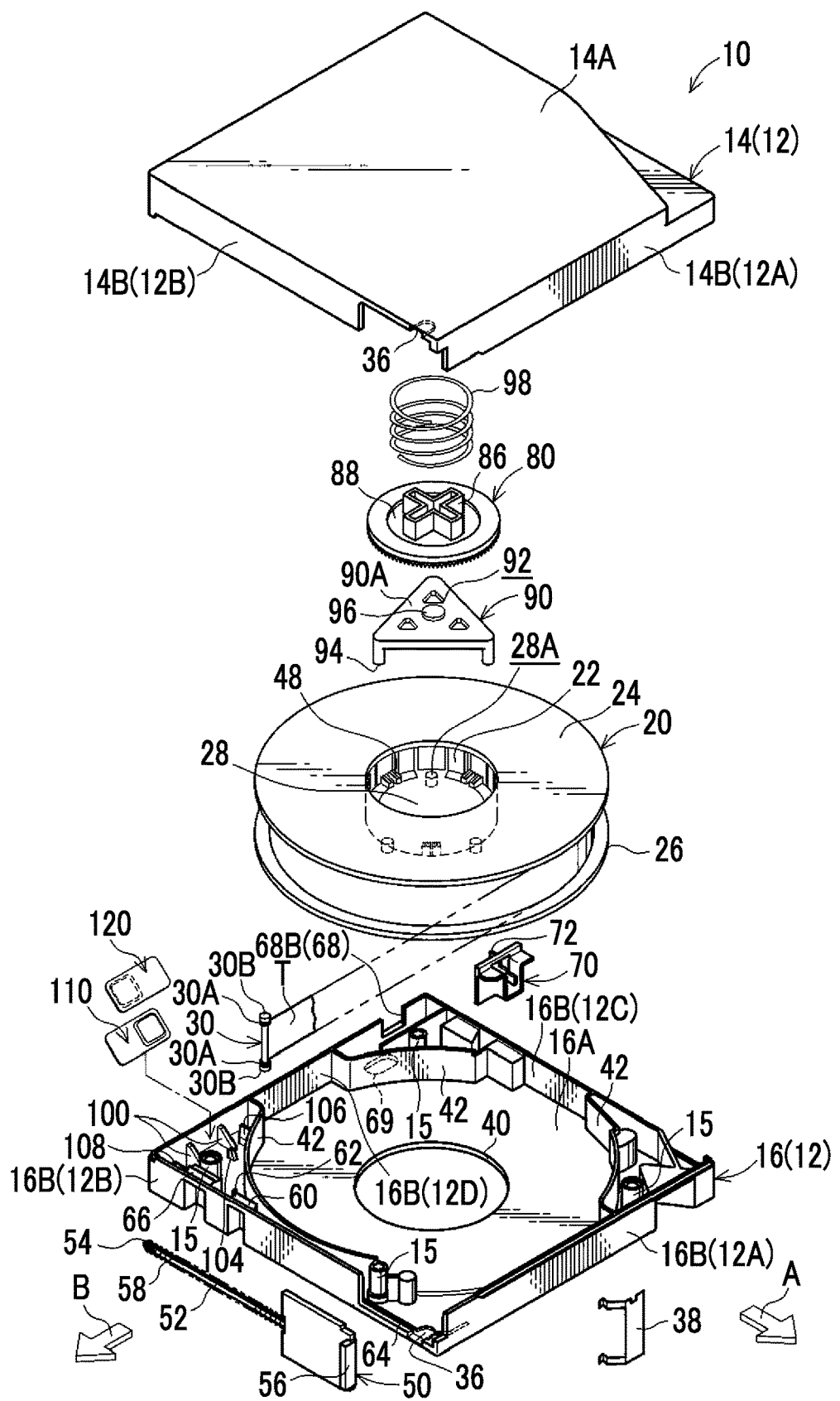
FIG. 2 is an exploded perspective view of the recording tape cartridge according to the present embodiment as seen from above.
Figure 3:
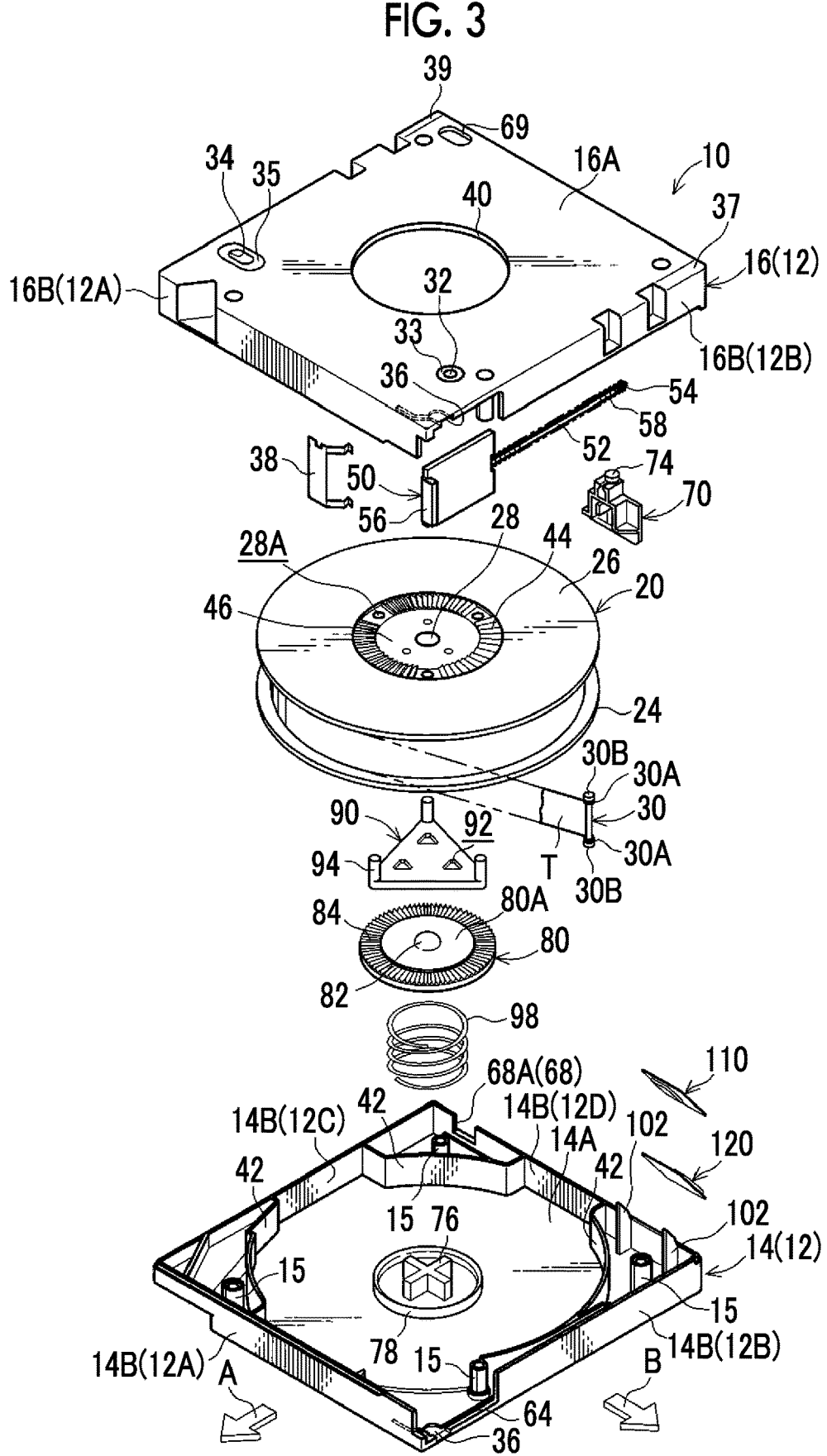
FIG. 3 is an exploded perspective view of the recording tape cartridge according to the present embodiment as seen from below.

As shown in FIGS. 1 to 3, the recording tape cartridge 10 includes a case 12 having an approximately rectangular box shape. The case 12 is configured by bonding an upper case 14 and a lower case 16 through ultrasonic welding, screwing, or the like in a state where a peripheral wall 14B erected on a peripheral edge of a top plate 14A and a peripheral wall 16B erected on a peripheral edge of a bottom plate 16A abut against each other (abutting each other or being close to each other), the upper case 14 and the lower case 16 being made of resin such as polycarbonate (PC).

That is, for example, a screw boss 15 is formed in the vicinity of each corner portion of the upper case 14 and the lower case 16 and the case 12 is assembled with screws (not shown) screwed into the screw bosses 15 from a lower surface side of the lower case 16. In addition, a single reel 20 is rotatably accommodated in the case 12 with a direction along a vertical direction being an axial direction thereof.

The reel 20 is configured by integrally molding a bottomed cylindrical reel hub 22 constituting an axial center portion and a lower flange 26 provided at a lower end portion of the reel hub 22 and welding an upper flange 24 to an upper end portion of the reel hub 22 through ultrasonic welding. In addition, a recording tape T such as a magnetic tape serving as an information recording and reproducing medium is wound on an outer peripheral surface of the reel hub 22, and end portions of the wound recording tape T in a width direction are held by the upper flange 24 and the lower flange 26.

In addition, a reel gear 44 is formed in an annular shape on a lower surface of a bottom wall 28 of the reel hub 22 and a gear opening 40 for exposure of the reel gear 44 to the outside is drilled into a central portion of the lower case 16. With the reel gear 44 exposed through the gear opening 40 and rotationally driven while meshing with a drive gear (not shown) formed on a rotary shaft (not shown) of a drive device (not shown), the reel 20 can rotate relative to the case 12 in the case 12.

In addition, a reel plate 46, which is an annular metal plate made of a magnetic material, is coaxially and integrally fixed to a radially inner side of the reel gear 44 of the lower surface of the bottom wall 28 through insert molding and is adsorbed and held by a magnetic force of an annular magnet (not shown) provided at the rotary shaft of the drive device. Furthermore, the reel 20 is held so as not to wobble by play restricting walls 42 which partially protrude from inner surfaces of the upper case 14 and the lower case 16 and serve as inner walls on a circular trajectory coaxial with the gear opening 40.

In addition, an opening 18 through which the recording tape T wound on the reel 20 is pulled out is formed in a right wall 12B of the case 12. A leader pin 30, which is locked by a pull-out member (not shown) of the drive device and is operated to be pulled out, is fixed to a free end portion of the recording tape T which is pulled out through the opening 18.

Annular grooves 30A are formed on the opposite end portions of the leader pin 30, which protrude further than the end portions of the recording tape T in the width direction, and the annular grooves 30A are locked by a hook or the like of the pull-out member. Accordingly, the hook or the like does not come into contact with the recording tape T and the recording tape T is not damaged in a case where the recording tape T is pulled out.

In addition, in the opening 18 of the case 12, that is, at an inner surface of the top plate 14A of the upper case 14 and an inner surface of the bottom plate 16A of the lower case 16, a pair of upper and lower pin holding portions 36 that positions and holds the leader pin 30 in the case 12 is provided. Each pin holding portion 36 has an approximately semicircular shape of which a side, to which the recording tape T is pulled out, is open and opposite end portions 30B of the leader pin 30 in an upright state can enter and exit the pin holding portions 36 through the open sides.

In addition, a plate spring 38 is fixed and disposed near the pin holding portions 36 and a bifurcating distal end portion of the plate spring 38 engages with the upper and lower opposite end portions 30B of the leader pin 30 such that the leader pin 30 is held at the pin holding portions 36. Note that, in a case where the leader pin 30 enters or exits the pin holding portions 36, the distal end portion of the plate spring 38 is elastically deformed appropriately such that the leader pin 30 is allowed to move.

In addition, the opening 18 is opened and closed by a door 50. The door 50 is formed in an approximately rectangular plate shape that has a size such that the opening 18 can be closed by the door 50 and groove portions 64, into which upper and lower end portions of the door 50 are slidably fitted, are formed in the top plate 14A and the bottom plate 16A inside the opening 18 such that the door 50 can move along the right wall 12B of the case 12.

In addition, a shaft 52 protrudes at the center of a rear end portion of the door 50 and a coil spring 58 is fitted onto the shaft 52. In addition, an expansion portion 54, which prevents the coil spring 58 from falling off, is formed at a rear end of the shaft 52. In addition, a supporting base 60 that includes a locking portion 62 at which a rear end of the coil spring 58 fitted onto the shaft 52 is locked protrudes at the lower case 16.

Accordingly, since the shaft 52 is slidably supported on the supporting base 60 and the rear end of the coil spring 58 is locked at the locking portion 62, the door 50 is urged at all times in a direction, in which the opening 18 is closed, by an urging force of the coil spring 58. Note that, it is preferable that a supporting base 66, which supports the shaft 52 in a case where the opening 18 is opened, is further provided to protrude behind the supporting base 60.

In addition, a projecting portion 56 for an opening and closing operation protrudes outward at a front end portion of the door 50. The projecting portion 56 engages with an opening and closing member (not shown) on the drive device side in a case where the recording tape cartridge 10 is loaded into the drive device. Accordingly, the door 50 is opened against the urging force of the coil spring 58.

In addition, as shown in FIG. 3, a pair of non-through reference holes 32 and 34 is formed in the bottom plate 16A of the lower case 16 at the same position in a front-rear direction, the reference holes 32 and 34 being separated from each other in a lateral direction. The reference hole 32 on the right wall 12B side is formed in an approximately circular shape as seen in a bottom view, and the reference hole 34 on a left wall 12C side is formed in an approximately elliptical shape that is long in the lateral direction as seen in the bottom view.

In addition, in a case where the recording tape cartridge 10 is loaded into the drive device, positioning members (not shown) provided in the drive device are inserted into the reference hole 32 and the reference hole 34, respectively. As a result, the recording tape cartridge 10 (case 12) is positioned in the front-rear direction and the lateral direction in the drive device.

In addition, around the reference hole 32 and the reference hole 34 in the bottom plate 16A, a mirror-finished approximately circular reference surface 33 and a mirror-finished approximately elliptical reference surface 35 are formed. In addition, a reference surface 37 and a reference surface 39, which are mirror-finished and have a rectangular shape (rectangular shape of which the longitudinal direction is parallel to front-rear direction), are also formed at the rear end corners of the bottom plate 16A. Note that, the reference surfaces 33, 35, 37, and 39 are on the same plane.

In a case where the recording tape cartridge 10 is loaded into the drive device, positioning surfaces (not shown) provided in the drive device abut the reference surface 33, the reference surface 35, the reference surface 37, and the reference surface 39, respectively. As a result, a thickness direction of the recording tape cartridge 10 (case 12) (height direction thereof and axial direction of reel 20) is positioned in the drive device.

In addition, as shown in FIGS. 2 and 3, a write protect 70 with which whether or not recording on the recording tape T is allowed is set is provided at a left rear portion of the case 12, the write protect 70 being slidable in the lateral direction. In addition, an opening hole 68, through which an operation projection 72 for manual operation of the write protect 70 protrudes, is formed at a rear wall 12D of the case 12.

The opening hole 68 is formed by a notch portion 68A formed in the peripheral wall 14B of the upper case 14 and a notch portion 68B formed in the peripheral wall 16B of the lower case 16 in a case where the upper case 14 and the lower case 16 are bonded to each other. Further, an elongated hole 69 through which a protrusion portion 74 of the write protect 70 is exposed is drilled into the lower case 16 with the longitudinal direction thereof being parallel to the lateral direction.

In a case where the recording tape cartridge 10 is loaded into the drive device, the position of the write protect 70 is detected on the drive device side such that whether or not recording on the recording tape T is allowed is automatically determined. Note that, the protrusion portion 74 of the write protect 70 does not protrude from a lower surface of the lower case 16.

In addition, a plurality of engaging gears 48 are erected on a peripheral edge of an upper surface of the bottom wall 28 of the reel hub 22 at predetermined gaps (at equal intervals) (for example, three engaging gears are erected at 120-degree intervals) and a plurality of through-holes 28A are drilled into predetermined positions above the reel gear 44 between the engaging gears 48 (in this case, three through-holes are drilled at 120-degree intervals). In addition, a disc-shaped braking member 80 molded of a resin material is provided inside the reel hub 22.

A braking gear 84 that can mesh with the engaging gear 48 is formed in an annular shape on a peripheral edge of a lower surface 80A of the braking member 80. On an upper surface of the braking member 80, an engaging projection 86 into which a rotation restricting rib 76 is inserted and which has an approximately cross shape as seen in a plan view is erected such that the height thereof is slightly higher than the height of the rotation restricting rib 76, the rotation restricting rib 76 protruding downward from the inner surface of the top plate 14A of the upper case 14 and having an approximately cross shape as seen in the plan view. Accordingly, the braking member 80 cannot rotate with respect to the case 12 (upper case 14) and is movable in the vertical direction (axial direction of reel 20) in the reel hub 22.

In addition, a compression coil spring 98 is provided between the upper case 14 and the braking member 80. That is, the compression coil spring 98 is provided in a state where one end thereof abuts the inside of an annular projection 78 (between rotation restricting rib 76 and annular projection 78) protrudes outside the rotation restricting rib 76 of the upper case 14 and the other end abuts the inside of an annular groove 88 provided on the upper surface of the braking member 80. The braking member 80 is urged downward by the urging force of the compression coil spring 98 at all times.

Therefore, in a case where the recording tape cartridge 10 is not in use (where recording tape cartridge is not loaded in drive device), the braking gear 84 is in a state of meshing with the engaging gear 48 at all times and the reel 20 is in a rotation-locked state where the relative rotation of the reel 20 with respect to the case 12 is prevented. Note that, at this time, the reel 20 is pressed against the lower case 16 by the urging force and the reel gear 44 is exposed through the gear opening 40.

In addition, inside the reel hub 22, a releasing member 90 that is molded of a resin material and has an approximately regular triangular shape as seen in the plan view is provided below the braking member 80 (between bottom wall 28 and braking member 80). A plurality of through-holes 92 having a predetermined shape are drilled into the releasing member 90 at appropriate positions (three hexagonal through-holes are drilled in drawing) to reduce the weight of the releasing member 90. In addition, at vertex portions on a lower surface of the releasing member 90, leg portions 94, which are inserted into the through-holes 28A and protrude from the lower surface of the bottom wall 28 over the reel gear 44 by a predetermined height, are provided to protrude.

In addition, a flat supporting projecting portion 96 is formed on the center of an upper surface 90A of the releasing member 90 and an approximately hemispherical releasing projection 82 protruding from the center of the lower surface 80A of the braking member 80 abuts the supporting projecting portion 96 (refer to FIGS. 2 and 3). Accordingly, the area of contact between the braking member 80 and the releasing member 90 is decreased and thus there is a decrease in sliding resistance in the case of use (rotation of reel 20). Note that, as the material of the braking member 80, for example, polyacetal (POM) is used and as the material of the releasing member 90, for example, polybutylene terephthalate (PBT) is used.

Figure 4:
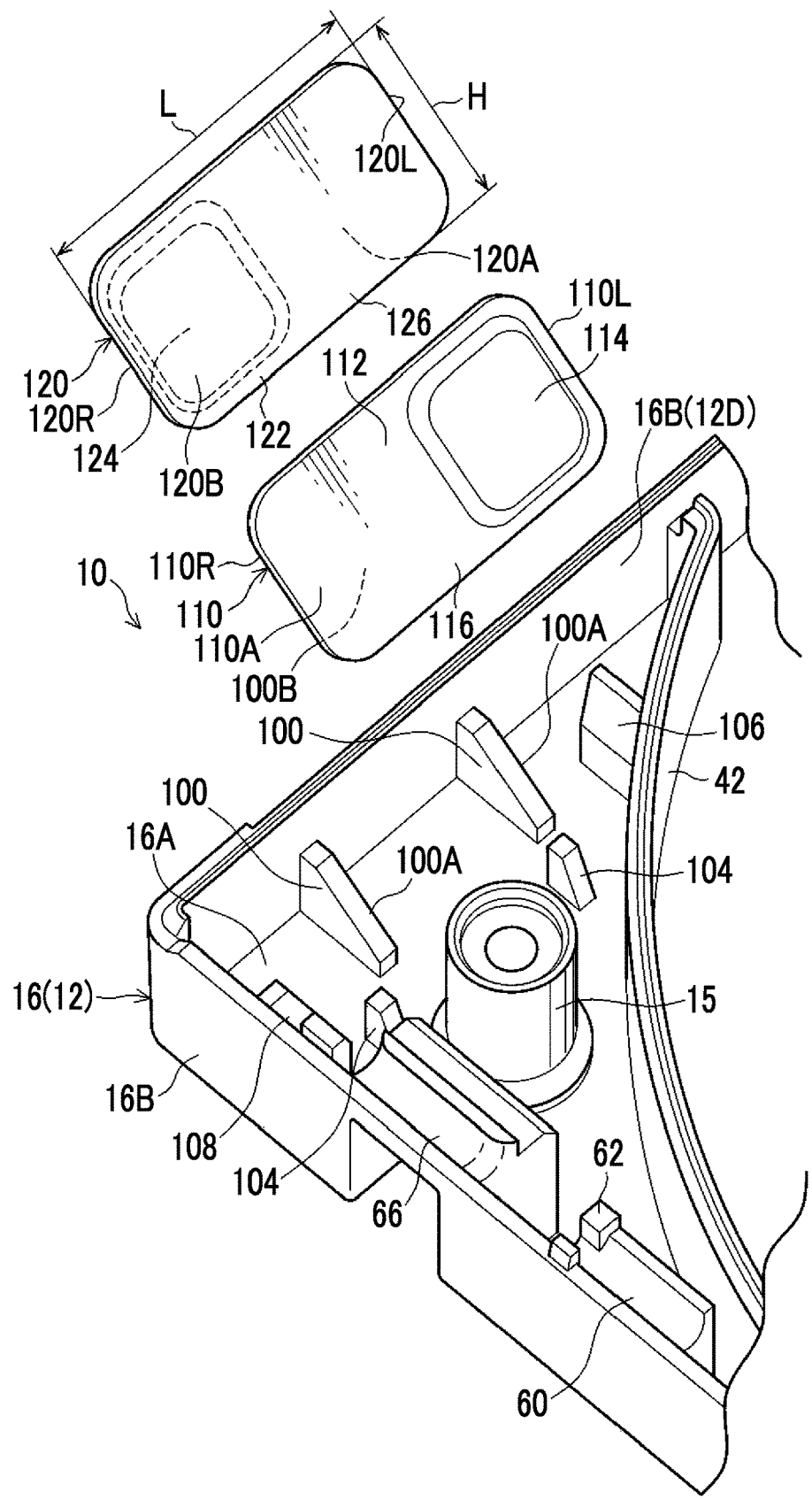
FIG. 4 is a perspective view showing a state before a cartridge memory built into the recording tape cartridge according to the present embodiment is supported by supporting ribs.
Figure 5:
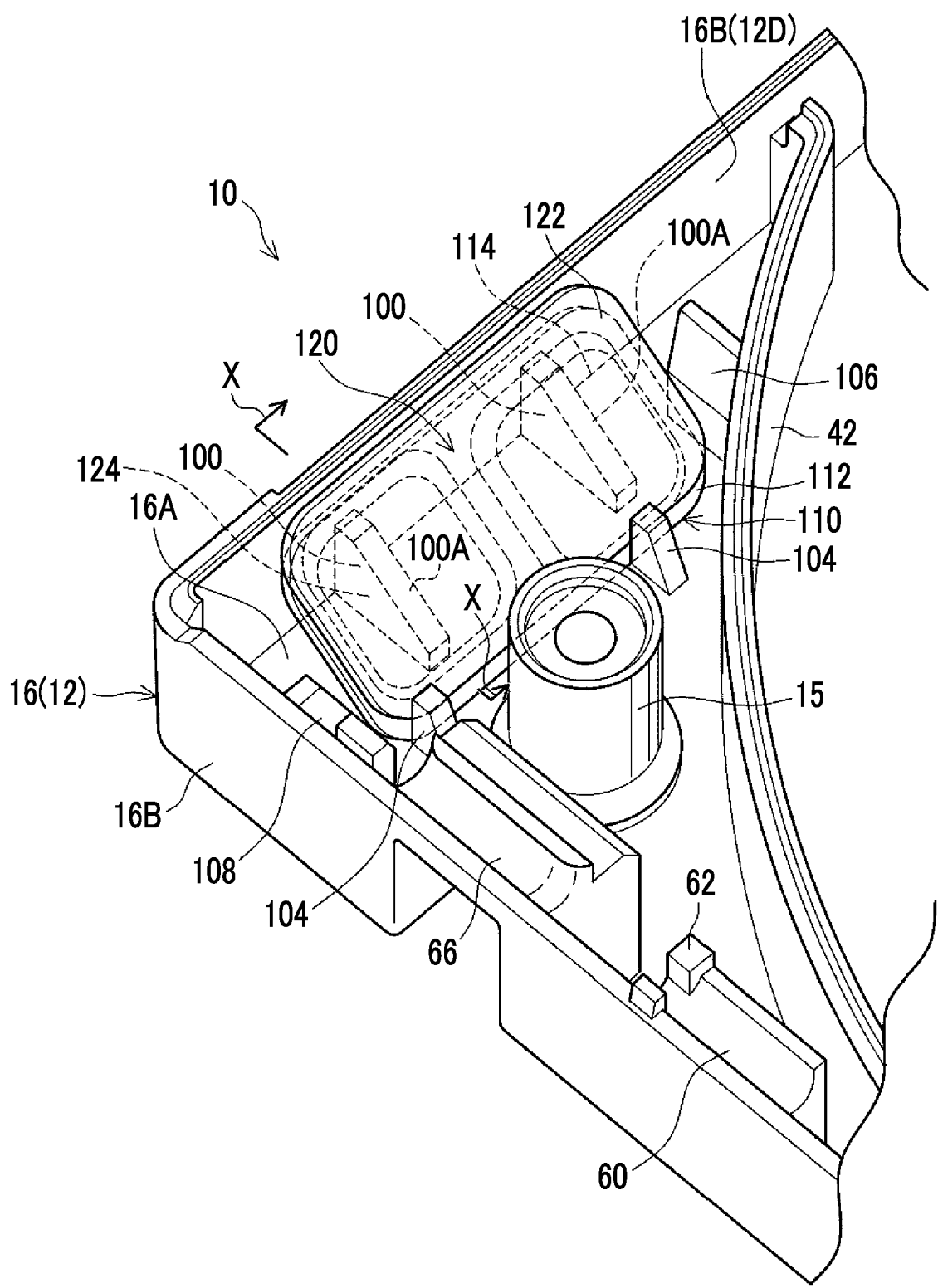
FIG. 5 is a perspective view showing a state after the cartridge memory built into the recording tape cartridge according to the present embodiment is supported by the supporting ribs.
Figure 6:
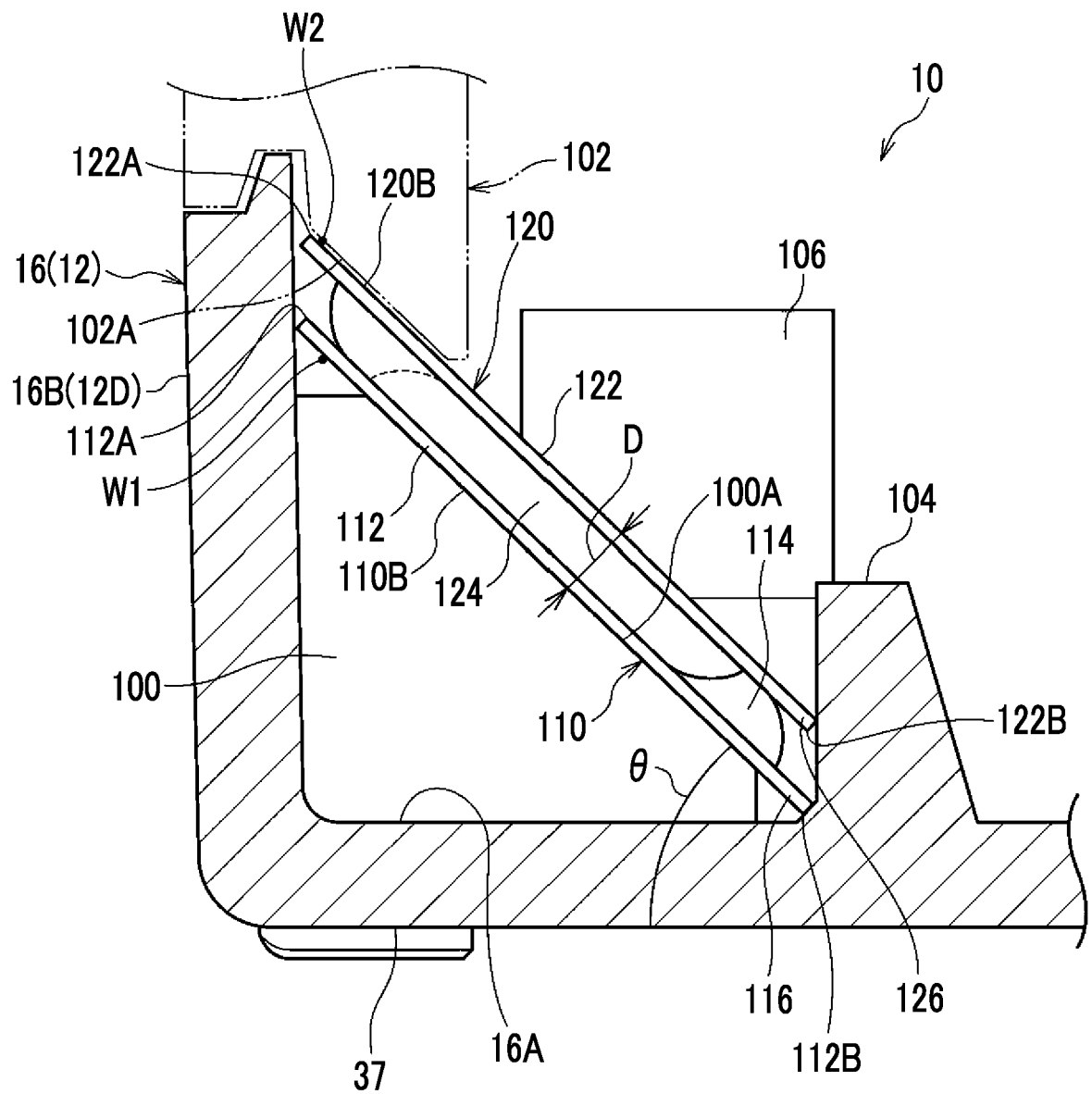
FIG. 6 is a sectional view taken along line X-X in FIG. 5 as seen in the arrow direction.

In addition, as shown in FIGS. 2 to 6, at a right rear portion of the case 12 (lower case 16), cartridge memories 110 and 120 as noncontact communication mediums in a state where the two cartridge memories overlap each other are disposed while being inclined with respect to the reference surfaces 33, 35, 37, and 39 at a predetermined angle θ (refer to FIG. 6).

Each of the cartridge memory 110 on a lower side and the cartridge memory 120 on an upper side is formed in an approximately rectangular flat plate shape (approximately rectangular shape as seen in plan view) of which the longitudinal direction is parallel to the lateral direction and the sizes (dimensions and shapes) thereof are defined by a standard and are the same as each other.

Specifically, for example, in the case of the cartridge memory 120 on the upper side, L=20 mm, H=10 mm, and D=1 mm, where the length of the cartridge memory in the lateral direction is L, the length (height) thereof in the vertical direction is H, and the thickness thereof including the thickness of a swollen portion 124 which will be described later is D (refer to FIG. 6) as shown in FIG. 4. Note that, the thickness of each of epoxy substrates 112 and 122, which will be described later, is 0.1 mm, for example. In addition, each of the cartridge memories 110 and 120 has an extremely light weight of about several g.

In addition, swollen portions 114 and 124, in which IC chips (not shown) are sealed and each of which has an approximately square shape as seen in the plan view, are provided on end portion sides in a longitudinal direction on one surfaces 110A and 120A of the cartridge memories 110 and 120. Note that, the cartridge memory 110 and the cartridge memory 120 vertically overlap each other such that the one surface 110A and the swollen portion 124 face each other and the one surface 120A and the swollen portion 114 face each other. In addition, on each of the other surfaces 110B and 120B of the cartridge memories 110 and 120, a coil-shaped antenna (not shown) that receives a magnetic field emitted from a noncontact reading and writing device (not shown) provided in the drive device is provided.

More specifically, the cartridge memories 110 and 120 are composed of the epoxy substrates 112 and 122, the IC chips provided on one surfaces of the epoxy substrates 112 and 122, the swollen portions 114 and 124 that are provided on the one surfaces of the epoxy substrates 112 and 122, protect the IC chips sealed therein, and are made of ultraviolet curable resin, and metal wires (antennas) that are electrically connected to the IC chips and are provided in a coil shape on the other surfaces of the epoxy substrates 112 and 122.

Individual information is recorded on the IC chip. Specifically, individual information such as a unique ID, recording capacity, recording format, product type identification, use history, production history, and an index of data recorded on the recording tape T of the recording tape cartridge 10 are recorded on the IC chip. Note that, individual information recorded on the IC chip of the cartridge memory 110 and individual information recorded on the IC chip of the cartridge memory 120 are different from each other. In addition, each IC chip is a so-called microcomputer type IC chip which is low in manufacturing cost and of which the communication distance is relatively short (power consumption is relatively large). However, the capacity thereof is, for example, 4 KB, 8 KB, or 16 KB, which is somewhat high.

As shown in FIGS. 2 and 4 to 6, two (one pair of) supporting ribs 100 as supporting portions, on which the cartridge memories 110 and 120 are disposed while being inclined at the predetermined angle θ (θ=approximately 45 degrees (specifically θ=45 degrees±5 degrees, preferably θ=45 degrees±2 degrees)), are integrally provided with inner surfaces of the bottom plate 16A and the peripheral wall 16B (rear wall 12D) of the lower case 16 behind the screw boss 15 on the right rear side and the supporting base 66 as seen in a side view such that the supporting ribs 100 protrude at a predetermined interval in the lateral direction.

As shown in FIG. 6, the supporting ribs 100 are formed in an approximately right angled triangular shape as seen in the side view and upper surfaces thereof inclined with respect to the reference surfaces 33, 35, 37, and 39 (refer to FIG. 3) of the lower case 16 at the predetermined angle θ are supporting surfaces 100A that support the other surface 110B of the cartridge memory 110 on the lower side except for a lower end portion 116. Note that, the lower end portion 116 of the cartridge memory 110 on the lower side refers to a region on the lower side where the supporting surfaces 100A of the supporting ribs 100 are not in contact with the cartridge memory 110 as seen in the side view. In addition, a lower end portion 126 of the cartridge memory 120 on the upper side refers to a region that faces the region described above in the vertical direction.

In addition, as shown in FIGS. 4 to 6, two (one pair of) position restricting ribs 104 as position restricting portions extending upward are integrally provided with the inner surface of the bottom plate 16A at a position ahead of the supporting ribs 100 such that the position restricting ribs 104 protrude at a predetermined interval in the lateral direction. The position restricting ribs 104 positionally restrict the lower end portions 116 and 126 of the cartridge memories 110 and 120 such that the lower end portions 116 and 126 are not displaced forward.

In addition, due to the position restricting ribs 104, the cartridge memory 110 and the cartridge memory 120 in a state where the two cartridge memories overlap each other in the vertical direction overlap each other while being partially offset from each other in a direction at the angle θ (θ=approximately 45 degrees) as seen in the side view.

More specifically, the cartridge memory 120 on the upper side is disposed while being offset from the cartridge memory 110 on the lower side in an oblique rearward and upward direction as seen in the side view. An edge portion 112A of an upper end portion of the epoxy substrate 112 and an edge portion 122A of an upper end portion of the epoxy substrate 122 are disposed at substantially the same positions in the front-rear direction and an edge portion 112B of a lower end portion of the epoxy substrate 112 and an edge portion 122B of a lower end portion of the epoxy substrate 122 are disposed at substantially the same positions in the front-rear direction (refer to FIG. 6).

In addition, as shown in FIGS. 2, 4, and 5, a position restricting rib 106 as a position restricting portion that positionally restricts left end portions 110L and 120L of the cartridge memories 110 and 120 (epoxy substrates 112 and 122) is integrally provided with the bottom plate 16A while protruding at a position to the left of the supporting ribs 100. Furthermore, a position restricting rib 108 as a position restricting portion that positionally restricts right end portions 110R and 120R of the cartridge memories 110 and 120 (epoxy substrates 112 and 122) is integrally provided with the bottom plate 16A while protruding at a position to the right of the supporting ribs 100.

As a result, the positions of the cartridge memories 110 and 120 are restricted in the front-rear direction and the lateral direction. In addition, as shown in FIGS. 3 and 6, two (one pair of) holding ribs 102 as position restricting portions that positionally restrict the other surface 120B of the cartridge memory 120 on the upper side (uppermost cartridge memory) from above are integrally provided with the inner surface of the top plate 14A of the upper case 14 behind the screw boss 15 on the right rear side such that the holding ribs 102 protrude at a predetermined interval in the lateral direction.

The holding ribs 102 are formed in approximately trapezoidal shapes which are congruent (same) as seen in a side view and lower end surfaces 102A thereof are obliquely cut out in accordance with the predetermined angle θ of the supporting ribs 100. Therefore, in a case where the lower case 16 and the upper case 14 are bonded to each other, the lower end surfaces 102A of the holding ribs 102 face the other surface 120B of the cartridge memory 120 on the upper side with a slight gap interposed therebetween or come into contact with the other surface 120B lightly and thus the cartridge memory 120 and the cartridge memory 110 are positionally restricted toward the supporting ribs 100.

As a result, regardless of the posture of the recording tape cartridge 10 (case 12), the cartridge memory 110 on the lower side on which the cartridge memory 120 is stacked is held without being displaced from a position above the supporting surfaces 100A and is stably disposed while being inclined at the predetermined angle θ.

Next, the operation of the recording tape cartridge 10 according to the present embodiment configured as described above will be described.

The recording tape cartridge 10 is loaded into the drive device with a front wall 12A being at the front. Then, the door 50 slides such that the opening 18 is opened and the positioning members (not shown) provided in the drive device are relatively inserted into the reference hole 32 and the reference hole 34, respectively. In addition, the positioning surfaces (not shown) provided in the drive device relatively abut the reference surface 33, the reference surface 35, the reference surface 37, and the reference surface 39, respectively. As a result, the recording tape cartridge 10 (case 12) is positioned in the front-rear direction, the lateral direction, and the thickness direction (height direction) in the drive device.

In addition, the rotary shaft (not shown) provided in the drive device relatively enters the case through the gear opening 40 and thus the drive gear (not shown) meshes with the reel gear 44. Then, as the drive gear meshes with the reel gear 44, the leg portions 94 protruding over the reel gear 44 are pushed up against the urging force of the compression coil spring 98 and the braking member 80 is pushed upward via the releasing member 90 such that the braking gear 84 and the engaging gear 48 meshing with each other are released from each other.

Then, in a state where the drive gear and the reel gear 44 mesh with each other, the reel plate 46 is adsorbed and held by the magnetic force of an annular magnet provided inside the drive gear. Accordingly, the reel 20 enters an unlocked state where a mesh between the reel gear 44 and the drive gear is maintained and the reel 20 can rotate relative to the case 12 in the case 12.

In addition, the noncontact reading and writing device provided in the drive device accesses the IC chips of the cartridge memories 110 and 120 from below in a noncontact manner. That is, a magnetic field is emitted from the noncontact reading and writing device and the antennas of the cartridge memories 110 and 120 receive the magnetic field. Therefore, an electromotive force is generated and the noncontact reading and writing device reads individual information recorded on the IC chips or writes individual information on the IC chips.

Here, the cartridge memory 110 on the lower side and the cartridge memory 120 on the upper side are disposed while being accurately inclined with respect to the reference surfaces 33, 35, 37, and 39 at the predetermined angle θ (θ=approximately 45 degrees) by means of the supporting ribs 100, the position restricting ribs 104, the position restricting rib 106, and the position restricting rib 108 provided on the lower case 16 and the holding ribs 102 provided on the upper case 14.

In other words, the cartridge memory 110 on the lower side on which the cartridge memory 120 is stacked in a state where the one surface 120A and the swollen portion 114 face each other and the one surface 110A and the swollen portion 124 face each other is stably held at the angle θ without being displaced from the position above the supporting surfaces 100A. Therefore, it is possible to position the cartridge memories 110 and 120 with respect to the lower case 16 while reducing the total thickness of the two cartridge memories 110 and 120 and restraining the cartridge memories 110 and 120 from being positionally offset from each other more than necessary.

Accordingly, even in the case of the cartridge memories 110 and 120 comprising IC chips with a low manufacturing cost and a somewhat high capacity of 4 KB, 8 KB, or 16 KB but a short communication distance, the antennas of the cartridge memories 110 and 120 can receive more magnetic field emitted from the noncontact reading and writing device (can generate more electromotive force).

That is, it is possible to improve the communication performance of the noncontact reading and writing device without changing the size of the cartridge memories 110 and 120 (size of antennas formed on other surfaces of epoxy substrates 112 and 122), and individual information is read or written by means of the noncontact reading and writing device with high accuracy. As described above, according to the present embodiment, even in the case of the cartridge memories 110 and 120 of which the communication distance is short, it is possible to secure the communication performance thereof.

In addition, since the pair of holding ribs 102 face the other surface 120B of the cartridge memory 120 on the upper side, on which no swollen portion 124 is provided, with a slight gap interposed therebetween or come into contact with the other surface 120B lightly, the right and left holding ribs 102 are formed in the same shape (one of holding ribs does not need to be changed in shape to be formed away from swollen portion 124). Therefore, it is possible to restrain the shape of a mold (not shown) for molding the upper case 14 from being complicated.

In addition, since the two cartridge memories 110 and 120 are built (accommodated) into a right rear portion (into one corner portion only) of the lower case 16 in a state of overlapping each other in the vertical direction, it is not necessary to change the position of the noncontact reading and writing device or the number of noncontact reading and writing devices. Therefore, it is possible to suppress an increase in manufacturing cost of the drive device.

That is, the noncontact reading and writing device may be configured to be able to individually perform a reading and writing operation with respect to the cartridge memory 110 on the lower side and the cartridge memory 120 on the upper side. Accordingly, it is possible to suppress or prevent an increase in installation space and installation cost for the noncontact reading and writing device in the drive device.

In addition, an appropriate combination of the cartridge memory 110 and the cartridge memory 120 comprising known IC chips having a capacity of 4 KB, 8 KB, or 16 KB may be provided in the lower case 16 (case 12) and it is not necessary to prepare a cartridge memory comprising an IC chip having a high capacity of 32 KB, for example. Therefore, for example, the development period, development cost, capital investment, and running cost for development of an IC chip having a high capacity of 32 KB are not necessary.

As described above, according to the present embodiment, it is possible to realize a high capacity of the cartridge memories 110 and 120 built into the case 12 at low cost (for example, providing two cartridge memories 110 and 120 comprising IC chips each having capacity of 16 KB is equivalent to providing cartridge memories comprising IC chips having capacity of 32 KB in total). Note that, the capacity of each of the cartridge memories 110 and 120 can be checked by means of a reading operation performed by the noncontact reading and writing device.

In addition, due to the position restricting ribs 104, the cartridge memory 120 on the upper side is disposed while being offset from the cartridge memory 110 on the lower side in the oblique rearward and upward direction as seen in the side view. That is, the edge portion 112A of the upper end portion of the epoxy substrate 112 and the edge portion 122A of the upper end portion of the epoxy substrate 122 are disposed at substantially the same positions in the front-rear direction and the edge portion 112B of the lower end portion of the epoxy substrate 112 and the edge portion 122B of the lower end portion of the epoxy substrate 122 are disposed at substantially the same positions in the front-rear direction.

Therefore, it is possible to reduce a space for accommodation of the cartridge memories 110 and 120 in the front-rear direction in comparison with a case where the cartridge memory 120 on the upper side is not disposed while being offset from the cartridge memory 110 on the lower side in the oblique rearward and upward direction, in other words, a case where the cartridge memory 110 and the cartridge memory 120 are disposed such that the epoxy substrates 112 and 122 completely coincide with each other in a direction orthogonal to the supporting surfaces 100A as seen in a side view as shown in FIG. 6.

Furthermore, it is possible to make the position of the outermost antenna (wire W1) provided on an upper end portion of the cartridge memory 110 on the lower side and the position of the outermost antenna (wire W2) provided on an upper end portion of the cartridge memory 120 on the upper side substantially the same as each other in the front-rear direction as seen in the side view as shown in FIG. 6.

Therefore, even in the case of a noncontact reading and writing device that is provided at a robot hand of a library device (not shown) and performs a reading and writing operation from the rear wall 12D side of the case 12, it is possible to secure the communication performance with respect to the cartridge memory 120 on the upper side and the cartridge memory 110 on the lower side. That is, even in the case of a noncontact reading and writing device that is provided at a robot hand of which a positional relationship with respect to the rear wall 12D of the case 12 is likely to be unstable, individual information recorded on the cartridge memories 110 and 120 is read or written with high accuracy.

In addition, since the cartridge memory 110 and the cartridge memory 120 have the same size (dimension and shape), for example, the cartridge memory 120 on the upper side may be turned upside down and disposed on the lower side and the cartridge memory 110 on the lower side may be turned upside down and disposed on the upper side.

That is, since the size of the cartridge memory 110 and the size of the cartridge memory 120 are the same as each other, it is possible to suppress or prevent a decrease in work efficiency for disposition of the cartridge memory 110 and the cartridge memory 120 in the lower case 16 (among position restricting ribs 104 and position restricting rib 106 and position restricting rib 108) in comparison with a case where the size of the cartridge memory 110 and the size of the cartridge memory 120 are different from each other.

In a case where data is to be recorded on the recording tape T or data in the recording tape T is to be reproduced, the pull-out member (not shown) provided in the drive device enters the case 12 through the opening 18 in an opened state and the leader pin 30 positioned and held by the pin holding portions 36 is gripped and pulled out by the pull-out member. At this time, the reel 20 can rotate as the leader pin 30 is pulled out since the reel 20 is not in the rotation-locked state.

The leader pin 30 extracted through the opening 18 is accommodated in a take-up reel (not shown) provided in the drive device. Then, as the take-up reel and the reel 20 are rotationally driven in synchronization with each other, the recording tape T is sequentially drawn out from the case 12 while being wound on the take-up reel and data is recorded or reproduced by a recording and reproducing head (not shown) provided along a predetermined tape path. Then, for example, use history or the like is recorded on the cartridge memory 120 on the upper side and an index of data or the like is recorded on the cartridge memory 110 on the lower side.

Hereinabove, the recording tape cartridge 10 according to the present embodiment has been described based on the drawings. However, the recording tape cartridge 10 according to the present embodiment is not limited to the recording tape cartridge shown in the drawings and the design thereof can be appropriately changed without departing from the gist of the present disclosure. For example, the cartridge memories 110 and 120 are not limited to a microcomputer type.

In addition, regarding the cartridge memories 110 and 120, a reading and writing operation may not be performed by the noncontact reading and writing device provided in the drive device. In a manufacturing line where the recording tape cartridge 10 is manufactured as well, a reading and writing operation is performed on the cartridge memories 110 and 120 by a noncontact reading and writing device provided in the manufacturing line. That is, production history or the like is recorded on the cartridge memory 110 or the cartridge memory 120 at this time.

In addition, the number of the cartridge memories 110 and 120 may be at least two and may be three or more. The upper case 14 is molded with the protrusion height of the holding ribs 102 adjusted in accordance with the number of the cartridge memories 110 and 120 accommodated in the case 12. In addition, although the two holding ribs 102 are provided, one or three or more holding ribs 102 may be provided. In addition, although the two position restricting ribs 104 are provided, three or more position restricting ribs 104 may be provided.

In addition, the way in which the cartridge memory 110 and the cartridge memory 120 overlap each other is not limited to the way in which the cartridge memory 110 and the cartridge memory 120 overlap each other as shown in the drawings. For example, the cartridge memory 110 and the cartridge memory 120 may overlap each other with the other surface 110B of the cartridge memory 110 and the other surface 120B of the cartridge memory 120 facing each other. In addition, the cartridge memory 110 and the cartridge memory 120 may overlap each other with the one surface 110A of the cartridge memory 110 and the other surface 120B of the cartridge memory 120 facing each other.

In addition, a plurality of the cartridge memories 110 and 120 may be disposed in the lower case 16 after being bonded to each other in advance. In addition, the antennas may be provided on the one surfaces 110A and 120A instead of the other surfaces 110B and 120B of the cartridge memories 110 and 120. In addition, the door 50 is not limited to a flat plate-shaped door of which the trajectory is linear as seen in a plan view and may be an approximately arc-shaped door of which the trajectory has an approximately arc shape as seen in the plan view, for example.

What is claimed is:
1. A recording tape cartridge comprising:
a case that accommodates a reel on which a recording tape is wound and includes a reference surface that serves as a reference in an axial direction of the reel in a case where the case is loaded into a drive device;
noncontact communication mediums on which individual information is recorded, the noncontact communication mediums being accommodated in the case in a state where at least two noncontact communication mediums overlap each other and having a plate shape; and
a supporting portion that is formed in the case and supports the noncontact communication mediums such that the noncontact communication mediums are disposed while being inclined with respect to the reference surface at an angle of approximately 45 degrees.
2. The recording tape cartridge according to claim 1, wherein a swollen portion, in which an IC chip is sealed, is provided on one end portion side in a longitudinal direction on one surface of the noncontact communication medium, and
two noncontact communication mediums overlap each other with the one surface and the swollen portion facing each other.
3. The recording tape cartridge according to claim 2, wherein the case includes an upper case and a lower case in which the noncontact communication mediums are accommodated, and
a pair of position restricting portions that restricts a position of the other surface of an uppermost noncontact communication medium is formed on the upper case, the position restricting portions being formed in the same shape as each other.

4. The recording tape cartridge according to claim 1, wherein two noncontact communication mediums overlap each other while being partially offset from each other in a direction at an angle of approximately 45 degrees.

5. The recording tape cartridge according to claim 1, wherein the at least two noncontact communication mediums are the same as each other in dimension and shape.

* * * * *